(12) United States Patent
Kubo

(10) Patent No.: US 6,992,711 B2
(45) Date of Patent: Jan. 31, 2006

(54) DIGITAL CAMERA WITH A PLURALITY OF MEDIA FOR RECORDING CAPTURED IMAGES

(75) Inventor: Hiroaki Kubo, Muko (JP)

(73) Assignee: Minolta Co., Ltd., Osaka (JP)

(*) Notice: Subject to any disclaimer, the term of this patent is extended or adjusted under 35 U.S.C. 154(b) by 846 days.

(21) Appl. No.: 09/739,141

(22) Filed: Dec. 18, 2000

(65) Prior Publication Data

US 2001/0012064 A1 Aug. 9, 2001

(30) Foreign Application Priority Data

Dec. 17, 1999 (JP) .................................. 11-359156

(51) Int. Cl.
*H04N 5/76* (2006.01)
(52) U.S. Cl. ............................. 348/231.7; 348/231.8; 348/231.9
(58) Field of Classification Search ............ 384/231.7, 384/231.8, 231.9
See application file for complete search history.

(56) References Cited

U.S. PATENT DOCUMENTS

| | | | | |
|---|---|---|---|---|
| 4,720,744 A | * | 1/1988 | Washi et al. ............... | 348/469 |
| 5,067,029 A | * | 11/1991 | Takahashi .................... | 386/38 |
| 5,153,730 A | * | 10/1992 | Nagasaki et al. .......... | 348/231.6 |
| 5,563,655 A | * | 10/1996 | Lathrop ..................... | 348/231.9 |
| 5,640,203 A | * | 6/1997 | Wakui ....................... | 348/231.8 |
| 5,682,208 A | * | 10/1997 | Harney ........................ | 348/699 |
| 5,734,425 A | * | 3/1998 | Takizawa et al. ......... | 348/231.9 |
| 5,933,847 A | | 8/1999 | Ogawa ...................... | 711/103 |
| 5,986,700 A | * | 11/1999 | Wakui ....................... | 348/231.8 |
| 6,583,893 B1 | * | 6/2003 | Satoh et al. ............... | 358/402 |
| 6,727,944 B1 | * | 4/2004 | Adachi .................... | 348/231.99 |
| 2002/0136293 A1 | * | 9/2002 | Washino ................ | 375/240.01 |
| 2004/0051785 A1 | * | 3/2004 | Yokonuma et al. ..... | 348/207.99 |

FOREIGN PATENT DOCUMENTS

| | | |
|---|---|---|
| JP | 04-078280 A | 3/1992 |
| JP | 05-103291 A | 4/1993 |
| JP | 05-276472 A | 10/1993 |
| JP | 09-027940 A | 1/1997 |
| JP | 09-130731 A | 5/1997 |
| JP | 10-341400 A | 12/1998 |
| JP | 2001-8147 A | 1/2001 |

* cited by examiner

*Primary Examiner*—Thai Tran
*Assistant Examiner*—James M. Hannett
(74) *Attorney, Agent, or Firm*—Sidley Austin Brown & Wood LLP

(57) ABSTRACT

A digital camera reduces the possibility that a user's release operation is disabled and performs photographing operations at the appropriate times. The digital camera (1) can load a memory card (40a) and a magnetic disk card (40b) as a plurality of recording media, wherein a CPU (17) can independently make accesses to the memory card (40a) and the magnetic disk card (40b). The CPU (17) performs a plurality of tasks in parallel, whereby a captured image is recorded on either one of the memory card (40a) and the magnetic disk card (40b) while predetermined processing is performed on the other. In such a configuration, a captured image which is stored in image memory (21) through a photographing operation can be recorded at an early stage on one of the recording media. This enables continuous photographing and the like even in such a condition that recording on a recording medium which is selected as a subject of recording is not allowed.

4 Claims, 14 Drawing Sheets

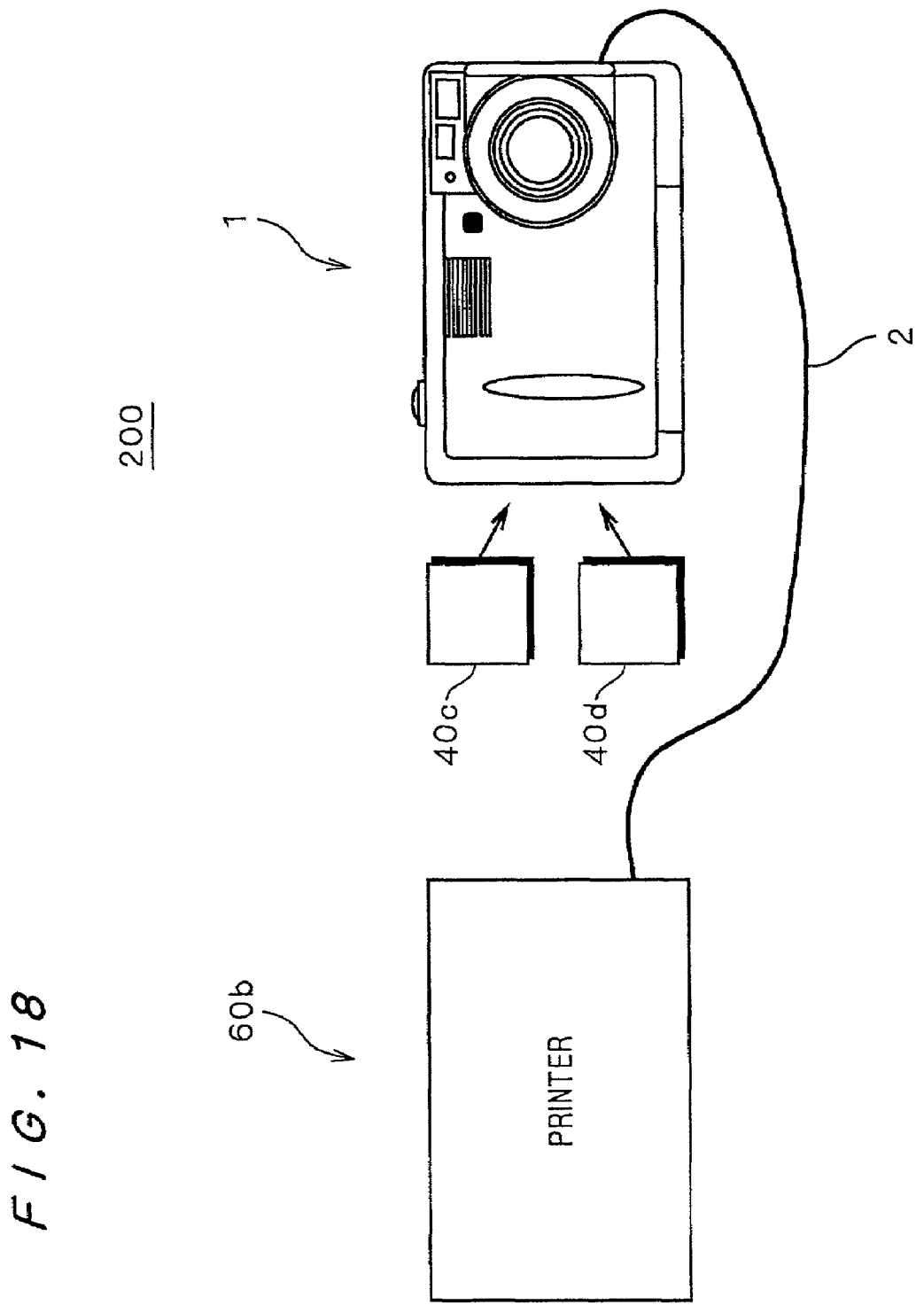

DIGITAL CAMERA WITH A PLURALITY OF MEDIA FOR RECORDING CAPTURED IMAGES

This application is based on application No. 11-359156 filed in Japan, the contents of which are hereby incorporated by reference.

BACKGROUND OF THE INVENTION

1. Field of the Invention

The present invention relates to a digital camera with a plurality of media for recording captured images, and an image recording system.

2. Description of the Background Art

General digital cameras are configured to be able to load a removable recording medium for recording and storing captured images. Recently, in order to increase the number of captured images that can be recorded, digital cameras with two card slots which can load two recording media are being prepared for the market.

In photographing a subject, a user selects, for example by operation of a changeover switch, one recording medium on which images are recorded out of those loaded in first and second slots; therefore, images obtained through photographing are recorded on the selected recording medium. That is, conventional digital cameras are configured to record captured images on a user-selected recording medium.

Conventionally, the dominating removable recording media for such digital cameras have been memory cards composed of semiconductor memory and the like, but magnetic disk cards each comprising a built-in magnetic disk device with high recording capacity are also being used in recent years.

For recording of captured images on a magnetic disk card, however, a predetermined starting time is necessary after activation of the magnetic disk card is started before captured images can be recorded. Thus, a captured image obtained in response to a photographing operation cannot be recorded immediately. When the digital camera is configured to start the activation of a magnetic disk card after a user's release operation for photographing, recording of captured images is not allowed during a period of time required for the activation and thus the next release operation is disabled. Accordingly, continuous photographing or the like becomes impossible.

Here, the magnetic disk card may always be placed in the active state to be able to record captured images all the time; however, such a configuration raises new problems about endurance of and power consumption in the magnetic disk card and thus it is not easily adaptable to transportable digital cameras.

Even if only one of two recording media which can be loaded in a digital camera is a magnetic disk card, the same problems as above described arise when a user selects the magnetic disk card as a subject of recording of captured images.

When not only the magnetic disk card but also any one of two recording media selected as a subject of recording is temporarily unusable because of being processed (e.g., being formatted), the recording of captured images is not allowed until that process is completed, and therefore the user's release operation is disabled.

To prevent the release operation from being disabled, a large-capacity buffer memory for temporarily recording a large number of captured images may be built in a digital camera on the precedent stage of a recording medium selected as a subject of recording. This, however, brings up another problem of increasing the product cost of digital cameras.

Although some digital cameras are provided with an interface for establishing a connection with external equipment (e.g., a printer or another digital camera), conventional digital cameras can only selectively perform either a photographing operation, or image data communications with the external equipment. Thus, the user's release operation is disabled during data communications with the external equipment.

The aforementioned problems result from the fact that even with a digital camera loading two recording media, only one user-selected recording medium is always to be accessed for recording or the like.

SUMMARY OF THE INVENTION

The present invention is directed to a digital camera.

According to an aspect of the present invention, the digital camera comprises: a temporary memory for temporarily storing a captured image generated in response to a photographing operation; a first medium for recording and storing the captured image; a second medium with a higher recording speed than the first medium, for recording and storing the captured image; and a controller for, when recording the captured image from the temporary memory to the first medium, recording the captured image once from the temporary memory to the second medium and then from the second medium to the first medium.

According to another aspect of the present invention, the digital camera which can load media comprises: a temporary memory for temporarily storing a captured image generated in response to a photographing operation; a first slot capable of loading a first medium for recording and storing the captured image; a second slot capable of loading a second medium for recording and storing the captured image; and a controller for, when recording the captured image from the temporary memory to the first medium on the condition that the second medium has a higher recording speed than the first medium, recording the captured image once from the temporary memory to the second medium and then from the second medium to the first medium.

As above described, the digital camera is configured such that when a captured image is recorded from the temporary memory to the first medium, the image is recorded once on the second medium with a high recording speed and then recorded from the second medium to the first medium. The captured image in the temporary memory can thus be recorded at a relatively high recording speed on one of the media. This frees the temporary memory at a relatively early stage, thereby reducing the possibility that a user's release operation is disabled.

Herein, the term "release", which is used in the description of film cameras, is also used in the description of digital cameras and refers to the start of photographing or the indication to start photographing in the case of digital cameras.

According to another aspect of the present invention, the digital camera comprises: a plurality of media provided for recording and storing a captured image generated in response to a photographing operation; and a controller capable of performing a plurality of tasks in parallel, the controller when performing a first task to record the captured image on a medium which is selected as a subject of recording out of the plurality of media, performing a second task which is different from the first task to perform predetermined processing on a medium which is not the subject of recording.

According to still another aspect of the present invention, the digital camera which can load media comprises: a plurality of slots capable of loading a plurality of media for recording and storing a captured image generated in response to a photographing operation; and a controller capable of performing a plurality of tasks in parallel, the controller when performing a first task to record the captured image on a medium which is selected as a subject of recording out of the plurality of media loaded in the plurality of tasks, performing a second task which is different from the first task to perform predetermined processing on a medium which is not the subject of recording.

As above described, the digital camera is configured to perform a plurality of tasks in parallel, i.e., to perform another second task, which is different from a first task, for predetermined processing on a medium which is not the subject of recording. In this case, the predetermined processing performed on a medium which is not the subject of recording permits effective continuation of a photographing operation rather than delaying that operation, which results in a reduction in the possibility that the release operation is disabled.

The present invention is also directed to an image recording system.

According to one aspect of the present invention, the image recording system comprises: a first digital camera; a second digital camera; and a transmission medium for providing a connection between the first and second digital cameras to make data communications possible, wherein the first digital camera comprises a controller capable of performing a plurality of tasks in parallel and performing a first task related to a photographing operation or recording of a captured image while performing a second task for data communications with the second digital camera through the transmission medium.

As above described, the first digital camera can perform a plurality of tasks in parallel and is configured so as to performs one task related to a photographing operation or recording of a captured image while performing another task for data communications with the second digital camera through the transmission medium. A user can thus establish data communications while continuing a release operation.

According to another aspect of the present invention, the image recording system is comprised of a digital camera and external equipment connected with each other. This digital camera comprises first and second media for recording a captured image and performs, in parallel, a task of recording the captured image on the first medium and a task of establishing data communications with the external equipment.

The digital camera is configured to perform, in parallel, a task of recording a captured image on the first medium and a task for data communications with external equipment. A user can thus establish data communications while continuing a release operation.

An object of the present invention is thus to provide a digital camera that can reduce the possibility that a user's release operation is disabled and can perform photographing operations at the appropriate times, and to provide an image recording system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 shows an image recording system having a printer connected.

DESCRIPTION OF THE PREFERRED EMBODIMENTS

Now, preferred embodiments of the present invention will be described with reference to the drawings.

<1. Construction of Digital Camera>

Figure 1A:
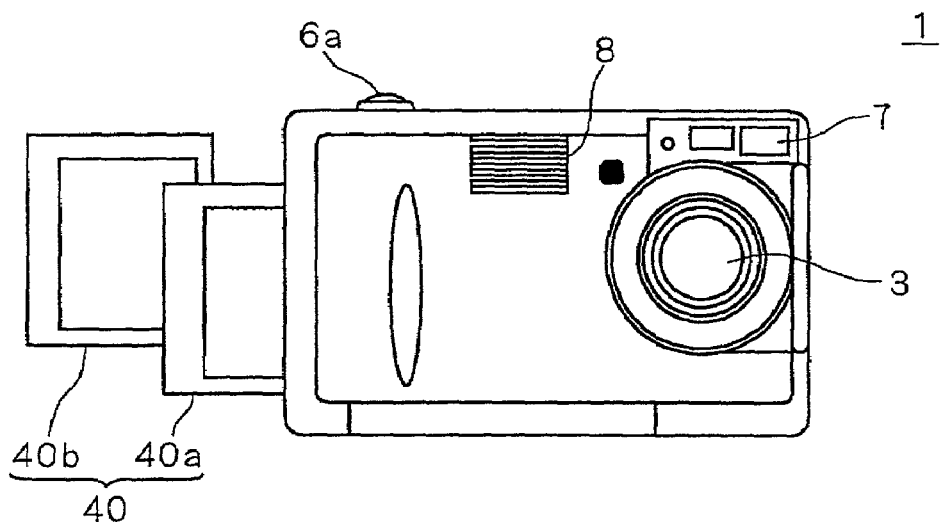
FIGS. 1A, 1B, 2A, and 2B are external views of a digital camera according to a preferred embodiment of the present invention.
Figure 1B:
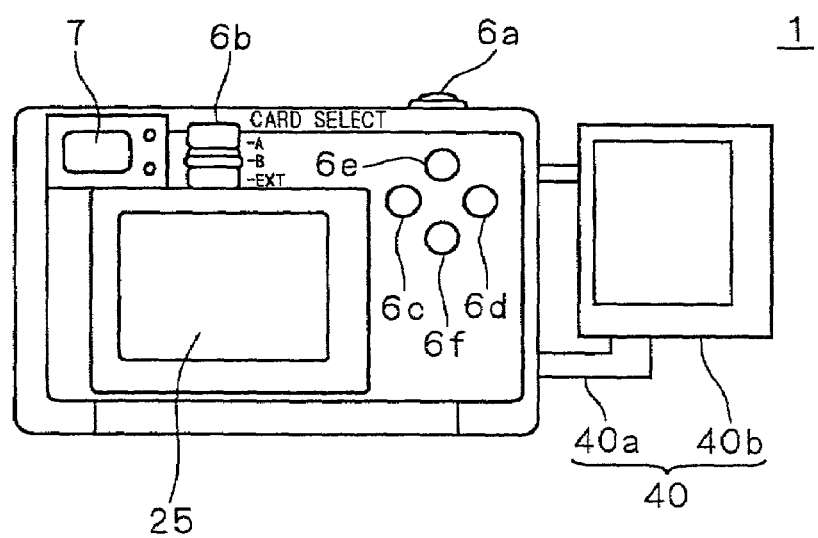
Figure 2A:
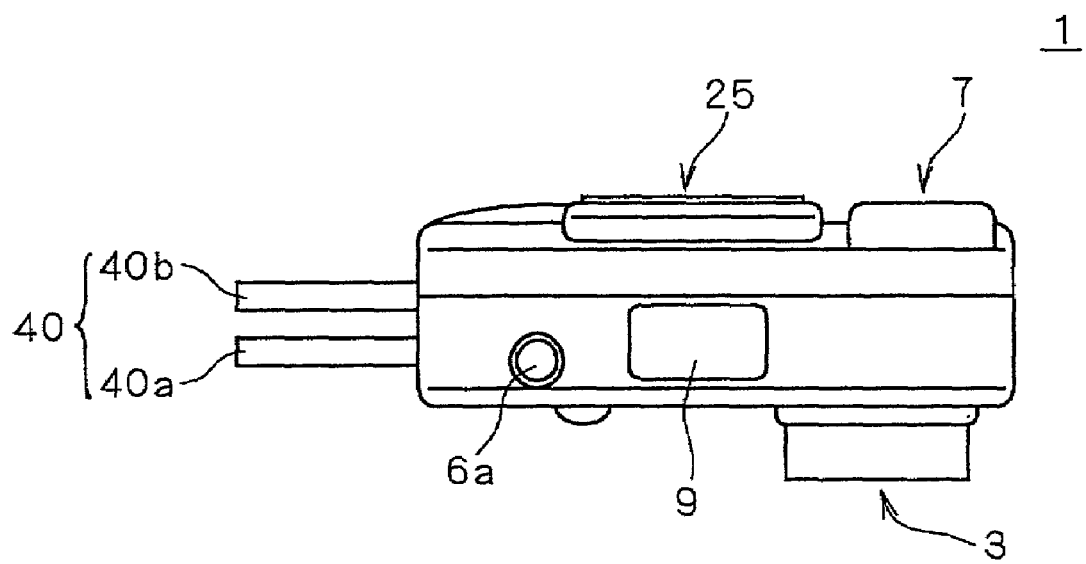
Figure 2B:
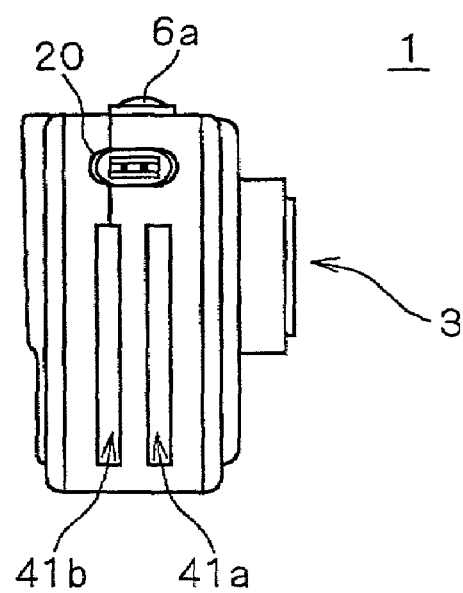

FIGS. 1A, 1B, 2A, and 2B are external views of a digital camera 1 according to a preferred embodiment of the present invention. FIG. 1A is a front view of the digital camera 1; FIG. 1B is a rear view thereof; FIG. 2A is a top view thereof; and FIG. 2B is a side view thereof.

On the front of the digital camera 1, a lens unit 3 for forming a subject image, an optical viewfinder 7 for determining the range of photography, and a flash 8 for shedding light on a subject are provided. On the back thereof, there are provided the optical viewfinder 7, a monitor 25 composed of, e.g., a color liquid crystal display for confirmation of a captured image, a setting selection switch 6b for selecting a recording medium 40 to be a subject of recording, and 4-way keys 6c, 6d, 6e, and 6f for use in scrolling captured images or changing various settings.

Further, a shutter start button 6a for use in capturing a subject image and a camera-function display unit 9 are provided on the top of the digital camera 1. The camera-function display unit 9 has a display function of displaying shooting or photographing conditions for the digital camera 1, card names for a plurality of recording media 40 loaded in the digital camera 1, and the like and allowing a user to visually identify which of the recording media 40 is selected as a subject of recording of captured images. The camera-function display unit 9 is composed of a monochrome display mode of compact liquid crystal display or the like and is provided aside from the monitor 25, which is for use in confirmation of captured images, so that a user can visually identify the photographing conditions and the selection of a recording medium 40 during photographing.

As shown in FIG. 2B, the digital camera 1 has in the side surface a plurality of slots 41a and 41b for loading the plurality of recording media 40, and an external interface 20 for establishing a connection between the digital camera 1 and external equipment.

In this preferred embodiment, a so-called slot indicates where a single medium is loaded. That is, the same opening which can load a plurality of media at the same time means that a plurality of slots are formed in that opening.

The plurality of slots 41a and 41b each can load a single recording medium 40. The recording medium 40 is a medium for recording a captured image generated through a photographing operation of the digital camera 1 and the like, which may be a memory card with a built-in semiconductor memory such as flash memory, or a magnetic disk card with a built-in magnetic disk device employing a magnetic recording system.

This preferred embodiment gives a case where mainly, the recording medium 40 loaded in the first slot 41a is a memory card 40a and the recording medium 40 in the second slot 41b is a magnetic disk card 40b.

For convenience of description, this preferred embodiment gives an example of two slots for loading recording media, but the number of slots is not limited thereto and it may be three or more. Further, on the surface around the respective slots 41a and 41b for recording media, characters such as "slot A" for the slot 41 a and "slot B" for the slot 41b are engraved so that a user can discriminate between those slots.

The external interface 20 is for communications in compliance with a USB (universal serial bus) or IEEE-1394 standard or the like, which allows input/output of captured image data from/to external equipment through a transmission medium such as a cable connected to the external interface 20.

Figure 3:
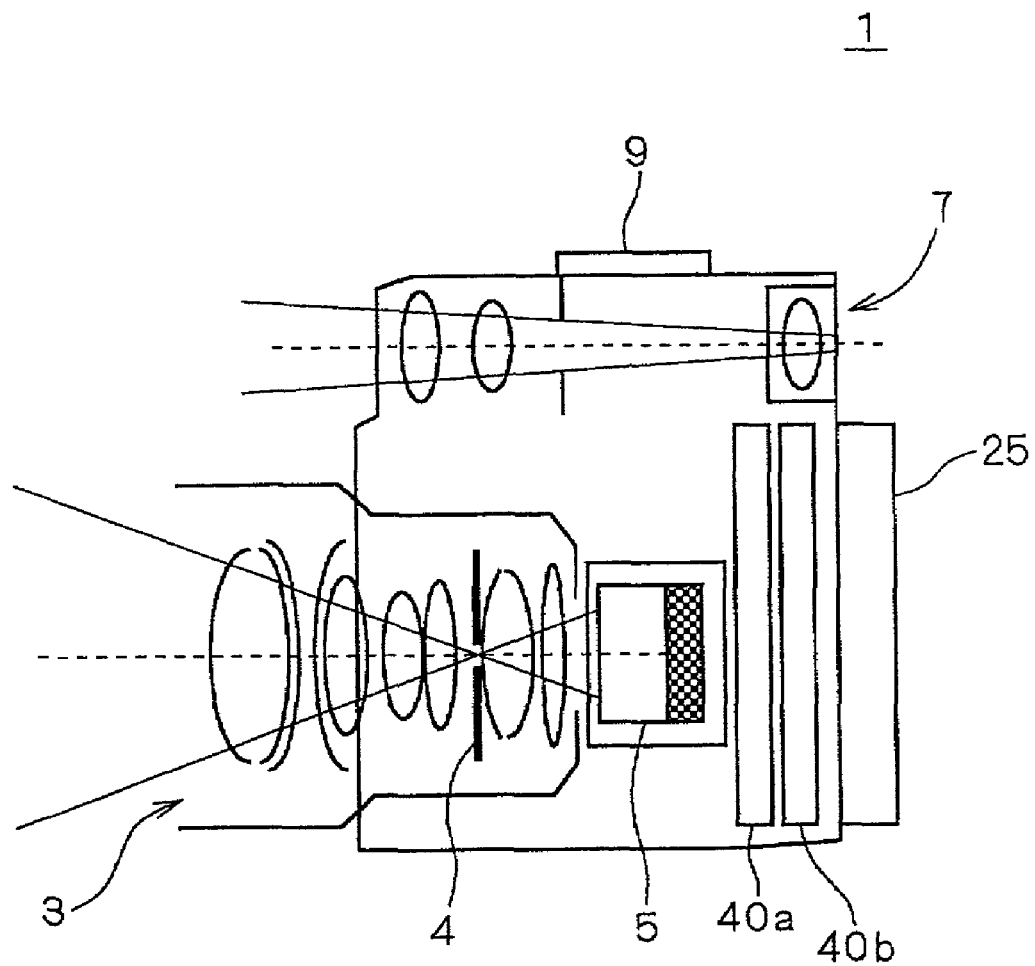
FIG. 3 is a schematic diagram of an internal structure of the digital camera.

FIG. 3 is a schematic diagram of the internal structure of the above-described digital camera 1. As shown in FIG. 3, the digital camera 1 has located therein the lens unit 3, a diaphragm 4, and an image sensor 5 and can hold the memory card 40a and the magnetic disk card 40b.

The image sensor 5 is a photoelectric device having a plurality of pixels in a plane (image surface) normal to the optical axis and being composed of an all-pixel-readout CCD area sensor or the like. On the image surface side of the image sensor 5, primary-color (red (R), green (G), and blue (B)) transmitting filters are placed on a pixel-by-pixel basis in checkered patterns, each pixel having sensitivity to each color component of a captured image which enters through the optical lens unit 3 and the diaphragm 4. Such an image sensor 5 corrects the amount of exposure by controlling a charge storage time.

Figure 4:
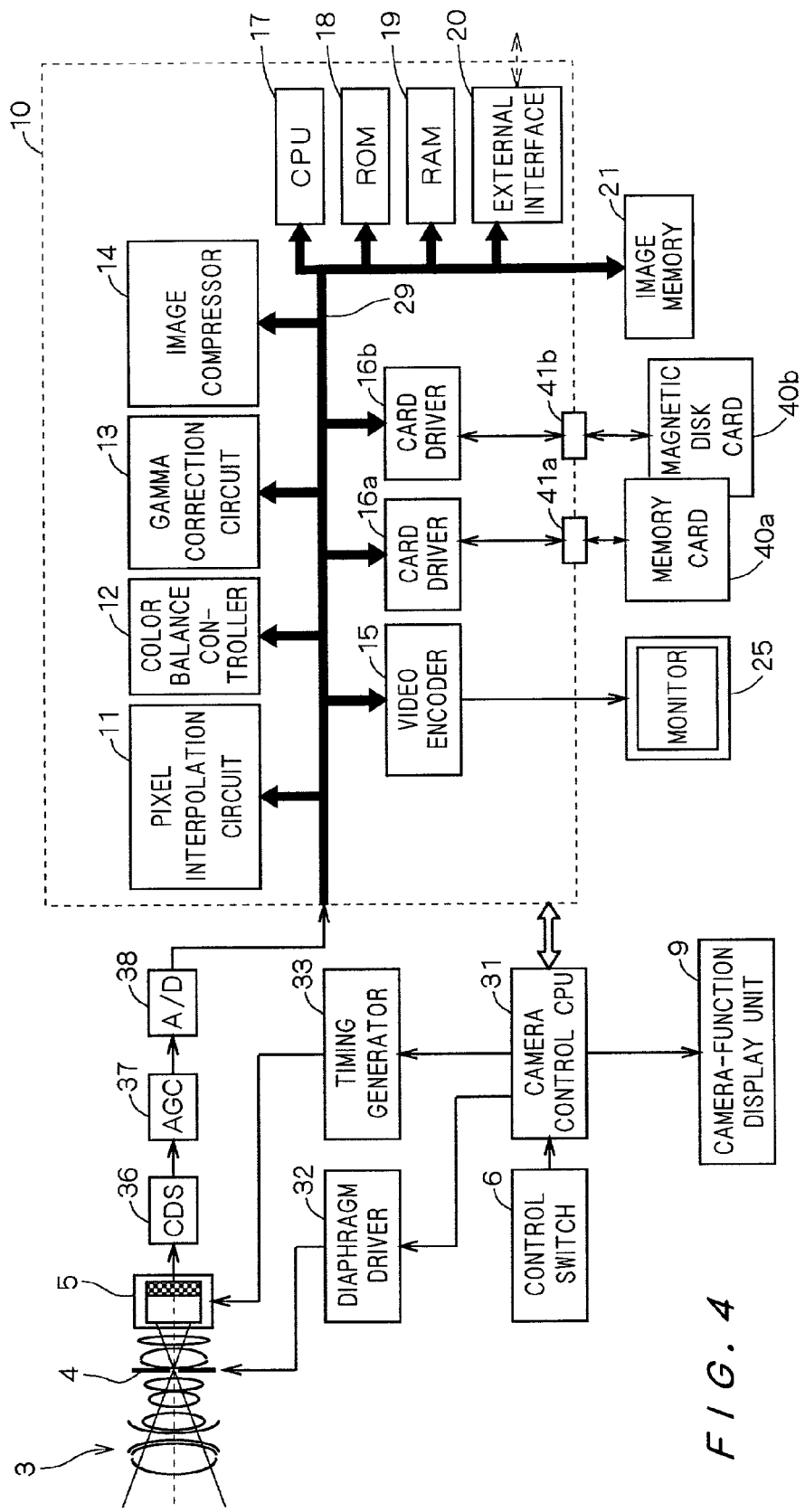
FIG. 4 is a block diagram of a functional structure of the digital camera.

Now, a functional structure of the digital camera 1 will be discussed. FIG. 4 is a block diagram of the functional structure of the digital camera 1.

Image signals which are photoelectric-converted in the image sensor 5 are shifted to a lightproof transmission path (not shown) in the image sensor 5 and then read out from this transmission path in sequence on a pixel-by-pixel basis through a buffer. The image signals obtained through the image sensor 5 are transmitted to an image processor 10 through a correlated double sampling (CDS) circuit 36, an automatic gain controller (AGC) 37, and an A/D converter 38. More specifically, the CDS circuit 36 samples the image signals to reduce the noise in the image sensor 5 and the AGC 37 makes sensitivity compensation. The A/D converter 38 is for example a 10-bit A/D converter, which converts normalized analog signals obtained from the AGC 37 into digital signals. Therefore, the image signals to be transmitted to the image processor 10 are digital signals.

For control of each structural unit in the digital camera 1, a camera control CPU (central processing unit) 31 is provided. This camera control CPU 31 is configured to control a photographing operation or the like during image capture or the like and to make setting changes for effecting various setting changes by a user. The CPU 31 also sends control signals to a diaphragm driver 32, a timing generator 33, and the like during photographing or the like.

An f-number of the diaphragm 4 and a storage time in the image sensor 5 are obtained through computations in the camera control CPU 31. According to the result of computations, the camera control CPU 31 gives control signals to the diaphragm driver 32 and the timing generator 33, thereby achieving a control system that allows the image sensor 5 to attain the appropriate amount of exposure in photographing.

According to the control signals from the camera control CPU 31, the diaphragm driver 32 drives the diaphragm 4 to adjust an aperture and the timing generator 33 controls the storage time, which is defined by storage start/stop timing, in the image sensor 5.

The camera control CPU 31 also gives to the camera-function display unit 9 the contents of display of the photographing conditions and the names for the memory card 40a and the magnetic disk card 40b obtained from the image processor 10. The camera-function display unit 9 thus serves as information display.

A control switch 6 is for input operations for a user to allow settings of the photographing conditions and to perform a photographing operation (release operation). This switch 6 includes all of the shutter start button 6a, the setting selection switch 6b, and the 4-way keys 6c, 6d, 6e, 6f, described above.

The setting selection switch 6b is a three-position slide switch as shown in FIG. 1B. The "up" position thereof is a position to select the memory card 40a loaded in the first slot 41a as a subject of recording of captured images; the "central" position is a position to select the magnetic disk card 40b loaded in the second slot 41b as a subject of recording of captured images; and the "down" position is a position to select external equipment connected to the external interface 20 as a subject of recording.

Based on the input from the control switch 6, the camera control CPU 31 makes settings of various photographing conditions, or it specifies a recording medium to be a subject of recording out of the memory card 40a and the magnetic disk card 40b, then transmits the contents of those settings to the image processor 10 and displays the same in the camera-function display unit 9 on top of the digital camera 1.

Figure 5:
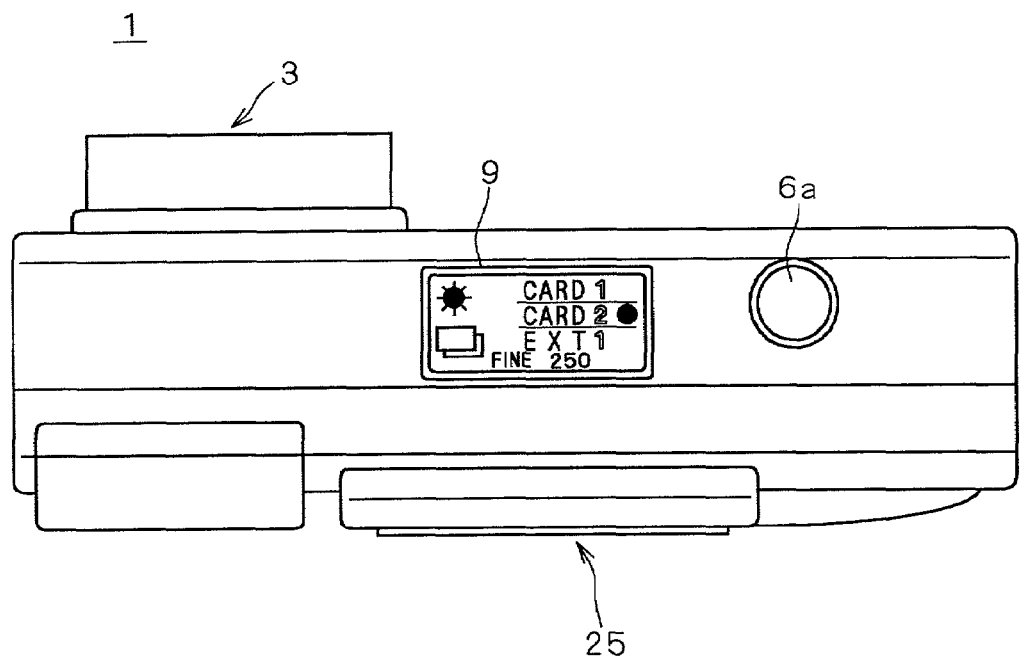
FIG. 5 shows an example of screen displayed in a camera-function display unit.

FIG. 5 shows the contents of screen displayed in the camera-function display unit 9, when viewing the digital camera 1 from the above. The camera-function display unit 9 displays the names for the memory card 40a and the magnetic disk card 40b loaded in the two slots 41a and 41b, the name for external equipment connected, an indication that which of the above three is selected as a subject of recording or readout, and the photographing conditions. The names for cards and external equipment and the indication of selection are displayed in a subject-of-access display area in the upper right hand of the camera-function display unit 9, and the photographing conditions are displayed in a segment display format in the other display area of the camera-function display unit 9.

As to the display of card names, as shown in FIG. 5, the name for the memory card 40a loaded in the slot 41a, i.e., "CARD 1", is displayed in the upper column, and the name for the magnetic disk card 40b loaded in the slot 41b, i.e., "CARD 2", is displayed in the middle column. Such display of the card names allows a user to readily and visually identify the slot in which each card is loaded even if the user loads each of the cards 40*a* and 40*b* without discriminating between the slots 41*a* and 41*b*. Further, the name for external equipment connected, i.e., "EXT 1", is displayed in the lower column.

The indication of selection of a subject to be accessed, e.g., a subject of recording, is given by placing a predetermined mark or the like (the closed circle in the example of FIG. 5) on the right side of the name for a card or external equipment which is selected by a user by operation of the setting selection switch 6*b* as above described. Such display of the indication of selection allows a user to always check which of the memory card 40*a*, the magnetic disk card 40*b*, and the external equipment is being selected as a subject of recording or the like.

When the shutter start button 6*a* included in the control switch 6 is fully pressed (i.e., when the release operation is performed), the camera control CPU 31 performs an image capturing operation by control of the diaphragm 4 and the image sensor 5 as above described.

The image processor 10 for performing a plurality of kinds of processing on digitized image signals is implemented for example in a single chip of IC (integrated circuit) and comprises, as its internal functions, a pixel interpolation circuit 11, a color balance controller 12, a gamma correction circuit 13, an image compressor 14, a video encoder 15, card drivers 16*a* and 16*b*, a CPU 17, a ROM (read only memory) 18, and a RAM (random access memory) 19, all of which are connected with each other through a data bus 29 and configured to be able to access an image memory 21 which serves as a temporary memory for temporarily storing captured images obtained with the image sensor 5. The image memory 21 is configured to be able to store a single frame of captured image generated through a photographing operation in response to a release operation.

The digitized image signals entering the image processor 10 are once stored in the image memory 21. The image stored in the image memory 21 undergoes pixel interpolation in the pixel interpolation circuit 11, white balance control in the color balance controller 12, predetermined conversions in the gamma correction circuit 13, and the like, and is then stored back in the image memory 21.

The pixel interpolation circuit 11, after reading out stored image data from the image memory 21 and masking that data in the filter pattern of the primary-color transmitting filters, performs average interpolation between predetermined peripheral pixels for each color component.

The color balance controller 12 adjust white balance by separately providing gain control for image signals of each color component generated by pixel interpolation. More specifically, a portion of a subject which is considered to be essentially in white is estimated from luminance, saturation, and the like and the gain of each color component is determined according to R, G, B colors in that portion. Then, the gain obtained is used to compensate for each color component, whereby white balance is automatically adjusted (automatic white balance control).

The gamma correction circuit 13 performs nonlinear conversion, which complies with output equipment (e.g., the monitor 25), on the white-balanced image data.

The image compressor 14 performs image compression in the JPEG format or the like on the image data, which is stored in the image memory 21 after going through a variety of image processing as above described, thereby to reduce the amount of image data to be recorded on the memory card 40*a* or the magnetic disk card 40*b*.

The image memory 21 has a capacity for a single frame in this example. In situations where the image data in the image memory 21 has not yet been processed, the next photographing (release) operation is disabled.

The card drivers 16*a* and 16*b* are electrically connected to the two slots 41*a* and 41*b* for loading recording media, respectively. These drivers are configured to access the memory card 40*a* and the magnetic disk card 40*b* loaded respectively in the slots 41*a* and 41*b* under control of the CPU 17 and to record or read out captured images or other data on or from those cards. The memory card 40*a* and the magnetic disk card 40*b* are removable from the respective slots 41*a* and 41*b*.

For individual access to the memory card 40*a* loaded in the slot 41*a* and the magnetic disk card 40*b* loaded in the slot 41*b*, the card drivers 16*a* and 16*b* are provided respectively for the slots 41*a* and 41*b*. This allows the CPU 17 to perform access processing individually and in parallel on the memory card 40*a* and the magnetic disk card 40*b*.

The video encoder 15 encodes image data, which describes an image stored in the image memory 21 or in the memory card 40*a* and the magnetic disk card 40*b*, in NTSC or PAL format data, thereby to display that image on the monitor 25. The monitor 25 thus serves as display for captured images.

The CPU 17, which is configured to be able to access the ROM 18 and the RAM 19, is a controller for achieving various functions by reading out and executing a program stored in the ROM 18. It exercises control over recording and any other operations when recording a captured image on a user-selected recording medium as a subject of recording.

Figure 6:
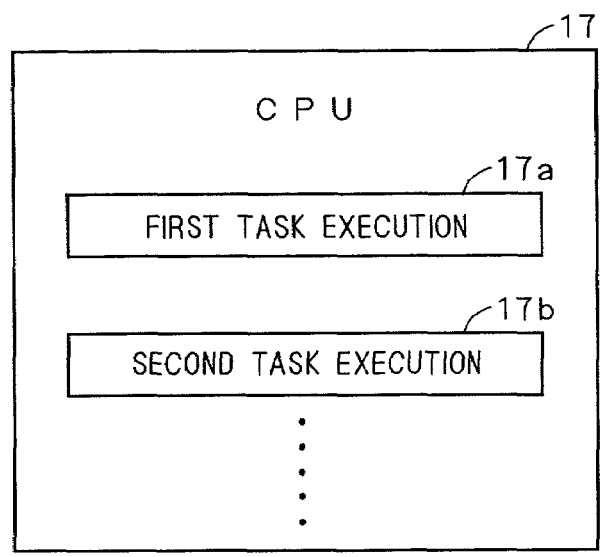
FIG. 6 schematically shows a form of functions achieved by a CPU.

FIG. 6 schematically shows a form of functions achieved by the CPU 17. The CPU 17 carries out functions of first task execution 17*a*, second task execution 17*b*, and so on. The above task execution is implemented to operate in parallel in a time-division multiplexed system. That is, the CPU 17 is configured to be able to perform a plurality of tasks in parallel in a time-division multiplexed system; therefore, it can perform a plurality of processing operations at once, e.g., one task of making access to the memory card 40*a* and another task of making access to the magnetic disk card 40*b*. In short, the CPU 17 as a controller can perform a plurality of processing operations in parallel at the same time.

The CPU 17 controls the operation of each of the above-described circuits or sections such as the pixel interpolation circuit 11 and causes a captured image, which has been generated through a photographing operation in response to a user's release operation and stored in the image memory 21, to be recorded on the memory card 40*a* or the magnetic disk card 40*b* according to the set position of the setting selection switch 6*b* so that the captured image can be stored in the user-selected recording medium for the long term.

With such a configuration of the CPU 17 that can perform a plurality of tasks in parallel, even when the digital camera 1 loads a plurality of recording media 40, execution of one task enables access to one recording medium selected as a subject of recording while execution of another task enables access to another recording medium. Further, execution of one task allows selection of one of the plurality of recording media 40 as a subject of access, while execution of another task allows any desired processing to be performed in parallel.

Such a configuration of the CPU 17 that can perform a plurality of tasks further reduces the length of time that the user's release operation is disabled. The following description gives how the CPU 17, serving as a controller, provides operating control for concrete recording processing of captured images.

<2. Parallel Processing for Magnetic Disk Card as Subject of Recording>

Now, a recording task when the magnetic disk card 40*b* is selected as a subject of recording is discussed. Herein, the term "task" refers to the overall process steps shown in FIG. 7, while the term "processing" refers to a concrete procedure in each step of the task.

When the magnetic disk card 40*b* is selected as a subject of recording and the activation thereof is performed after photographing, the long starting time is required before recording is enabled, and thus a captured image stored in the image memory 2 which is a temporary memory cannot be deleted until the activation is completed. If the captured image in the image memory 21 cannot be deleted, image data generated through subsequent photographing cannot be stored therein and the next photographing operation is disabled. In continuous photographing or the like, therefore, a captured image which is temporarily stored in the image memory 2 should preferably be recorded onto another recording medium as soon as possible. In this preferred embodiment, when the magnetic disk card 40*b* is selected as a subject of recording, the memory card 40*a* which can record a captured image at a higher speed than the magnetic disk card 40*b* is used as a temporary buffer, thereby to enable early deletion of the captured image from the image memory 21.

Figure 7:
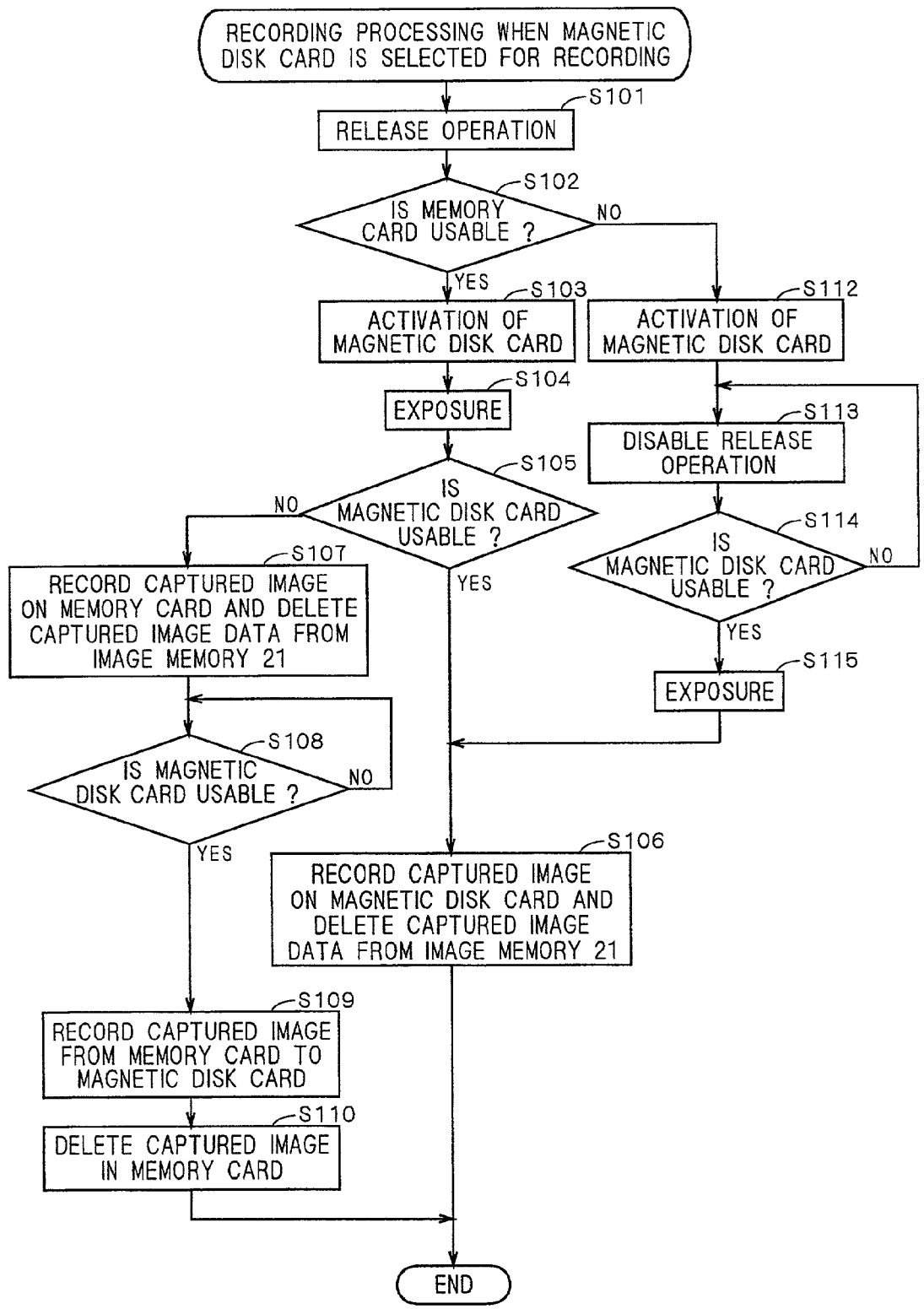
FIG. 7 is a flow chart of processing when a magnetic disk card is selected as a subject of recording.

FIG. 7 is a flow chart of recording processing when the memory card 40*a* is used as a buffer and the magnetic disk card 40*b* is selected as a subject of recording.

This task is performed on the condition that the release operation is not disabled. In step S101, a user performs a release operation. The execution of the release operation is transmitted from the camera control CPU 31 to the CPU 17 in the image processor 10.

The process goes to step S102, in which the CPU 17 determines whether the memory card 40*a* is usable or not. Herein, the memory card 40*a* being usable indicates the condition that the memory card 40*a* is loaded in the slot 41*a* of the digital camera 1 and has enough free space for recording a captured image. The CPU 17 thus determines whether the memory card 40*a* is loaded in the card slot 41*a* and whether it has enough free space. If so ("YES"), the process goes to step S103, in which case the memory card 40*a* is used as a temporary buffer before recording on the magnetic disk card 40*b*. If not ("NO"), the memory card 40*a* cannot be used as a buffer and the process goes to step S112 to record a captured image on the magnetic disk card 40*b* selected as a subject of recording.

In step S103, the CPU 17 starts the activation of the magnetic disk card 40*b*. Thereby, a magnetic disk in the magnetic disk card 40*b* starts rotating and begins an operation for activation. Once the CPU 17 starts the activation of the magnetic disk card 40*b*, the process goes to step S104. If the activation of the magnetic disk card 40*b* has already been started, the processing of step S103 is skipped.

In step S104, the CPU 17 transmits to the camera control CPU 31 a notification that an exposure operation in response to the release operation is enabled, whereby the camera control CPU 31 controls drive functions of the diaphragm 4, the image sensor 5, and the like to perform a photographing operation. Consequently, a captured image generated through the photographing operation in response to the release operation is stored in the image memory 21. Then, the captured image is subjected to image processing such as pixel interpolation as necessary so that it becomes recordable on the magnetic disk card 40*b* which is the subject of recording, and is temporarily held in the image memory 21.

The process then goes to step S105, in which the CPU 17 checks whether or not the magnetic disk card 40*b* activated in step S103 becomes usable. Herein, the magnetic disk card 40*b* being usable indicates the condition that the starting time for the magnetic disk card 40*b* has elapsed and the magnetic disk card 40*b* can perform a recording operation with stability. The CPU 17 goes to step S106 when "YES", i.e., when the magnetic disk card 40*b* can immediately record a captured image, while going to step S107 when "NO", i.e., when the starting time for the magnetic disk card 40*b* has not yet elapsed and thus a captured image cannot immediately be recorded on the card.

In step S107, the CPU 17 records the captured image stored in the image memory 21, being a temporary memory, on the memory card 40*a*. Since the memory card 40*a* is a medium employing a semiconductor memory, it generally has a higher recording speed than the magnetic disk card 40*b* and can complete the recording processing in a shorter time than would be possible in the case where the captured image is directly recorded on the magnetic disk card 40*b*.

Immediately after the completion of the recording processing of captured image on the memory card 40*a*, the CPU 17 deletes the temporarily stored image from the image memory 21. This frees the image memory 21 as a temporary memory at an early stage and enables the start of the next photographing operation.

In the next step S108, the CPU 17 determines, as in step S105, whether the magnetic disk card 40*b* becomes usable or not. The processing of step S108 is repeated until the magnetic disk card 40*b* becomes usable, and the captured image recorded on the memory card 40*a* as a temporary buffer is held as it is.

When the magnetic disk card 40*b* becomes usable, the process goes to step S109 in which the CPU 17 performs a task of recording the captured image stored in the memory card 40*a* onto the magnetic disk card 40*b*. That is, the processing of step S109 corresponds to the copying of captured image data from the memory card 40*a* into the magnetic disk card 40*b*.

In step S110, the captured image on the memory card 40*a* is deleted therefrom since the copying in step S109 makes unnecessary the captured image data which has been temporarily recorded on the memory card 40*a*.

Now, when step S105 judges the magnetic disk card 40*b* as being usable and the process goes to step S106, the captured image stored in the image memory 21 is recorded on the magnetic disk card 40*b*. The recording processing on the magnetic disk card 40*b* takes a longer time than that on the memory card 40*a*; however, when the activation of the magnetic disk card 40*b* is completed and a stable recording operation is possible, the captured image in the image memory 21 is recorded on the magnetic disk card 40*b* soon after exposure.

Immediately after the completion of the recording processing of captured image on the magnetic disk card 40*b*, the CPU 17 deletes the temporarily stored image from the image memory 21. This frees the image memory 21 which is a temporary memory at an early stage and enables the start of the next photographing operation.

Next described is processing when the CPU 17 selects "NO" in step S102 because the memory card 40*a* is not loaded in the slot 41*a* or does not have enough free space.

In this case, the CPU 17 starts the activation of the magnetic disk card 40*b* in step S112. In step S113, the release operation is disabled until the time required for the activation of the magnetic disk card 40*b* has elapsed, during which the camera control CPU 31 cannot obtain permission for photographing.

In step S114, the CPU 17 checks whether the magnetic disk card 40*b* activated in step S112 becomes usable or not. The CPU 17 goes to step S115 when "YES", i.e., when the magnetic disk card 40*b* can immediately record a captured image, while returning to step S113 when "NO", i.e., when the starting time for the magnetic disk card 40*b* has not yet elapsed and thus a captured image cannot immediately be recorded on the card.

When the activation of the magnetic disk card 40*b* is completed and a stable recording operation becomes possible, the CPU 17 in step S115 transmits to the camera control CPU 31 a notification that an exposure operation in response to the release operation is allowed. Thereby, the camera control CPU 31 controls drive functions of the diaphragm 4, the image sensor 5, and the like to perform a photographing operation. Consequently, a captured image generated through the photographing operation is stored in the image memory 21.

The process then goes to step S106 to record the captured image stored in the image memory 21 on the recordable magnetic disk card 40*b* and deletes that captured image from the image memory 21, thereby to enable the start of the next photographing operation.

This will complete the recording processing of captured image when the magnetic disk card 40*b* is selected as a subject of recording. The next photographing operation can be started at the time when the image memory 21 is freed in step S107 or S106. The CPU 17 performs, in response to the release operation, a plurality of tasks as shown in FIG. 7 in parallel. Thus, even if processing for a first photographing operation continues loop iterations when "NO" in step S108, processing for the next photographing operation can proceed as another task from step S101 in sequence as long as there is free space in the image memory 21.

In this case, the processing of steps S109 and S110 for "YES" in step S108 is performed in the background of the next photographing operation.

Once the activation of the magnetic disk card 40*b* is completed and the magnetic disk card 40*b* is made recordable, there is no need to reactivate the magnetic disk card 40*b* for recording of captured images obtained through subsequent photographing operations. Thus, the captured images can directly be recorded on the magnetic disk card 40*b* from the image memory 21. That is, for first several images, the process goes through the procedures from steps S101 to S105 and then from steps S107 to S110. On the other hand, in continuos photographing or the like after the completion of the activation of the magnetic disk card 40*b*, the process goes through the procedures from steps S101 to S106.

Therefore, when the memory card 40*a* is usable as above described, the use thereof as a temporary buffer during the activation of the magnetic disk card 40*b* allows a reduction in the length of time that the user's release operation is disabled.

In step S113, the magnetic disk card 40*b* is under activation and the release operation is disabled. In this case, the memory card 40*a* cannot be used and the same processing as before is performed. At this time, if the memory card 40*a* which does not have enough free space is used as a buffer, the captured image(s) stored in the memory card 40*a* may be damaged. Disabling the release operation is to avoid such a situation.

As above described, when the magnetic disk card 40*b* is the subject of recording, the use of the memory card 40*a* as a temporary buffer frees the image memory 21 as a temporary memory at a relatively early stage after photographing. The digital camera 1 can thus cope with even continuous photographing. With such a configuration that the removable memory card 40*a* is used as a buffer, the digital camera 1 does not build therein a high-capacity buffer memory as an ante-stage component for recording on the magnetic disk card 40*b*. This keeps down the product cost of the digital camera 1.

While the above description gives the case where the magnetic disk card 40*b* is selected as a subject of recording, the same applies to the case where an optical magnetic disk card or the like is loaded to the digital camera 1. Further, even if the magnetic disk card 40*b* is recordable after the completion of the activation, there may be a remarkable difference in recording speed between the magnetic disk card 40*b* and the memory card 40*a* and such a difference could be a problem to direct recording of a captured image on the magnetic disk card 40*b*. In such a case, the memory card 40*a* should always be used as a buffer when recording a captured image on the magnetic disk card 40*b*.

In other words, when two media loaded in the digital camera 1 have a high recording speed and a low recording speed, respectively, and a captured image is recorded from the image memory 21 onto the medium with a low recording speed, the digital camera 1 should be configured to record the image once from the image memory 21 onto the medium with a high recording speed and then from that medium onto the other with a low recording speed. By so doing, the recording of image from the image memory 21 can be performed at a higher recording speed. As a result, the image memory 21 can be freed at a relatively early stage, which allows efficient and effective use of resources in the digital camera 1.

If the digital camera 1 is configured to record a captured image once on the memory card 40*a* and then on the magnetic disk card 40*b* by performing a plurality of tasks, the copying of the captured image can be performed in parallel in the background of a main task performed by a user operation or the like. This eventually enables the user-transparent recording of the captured image on the selected magnetic disk card 40*b*.

Further, the captured image stored in the memory card 40*a* serving as a temporary buffer is deleted therefrom after copying into the magnetic disk card 40*b* is completed. The use of the memory card 40*a* as a buffer is thus transparent to the user, and even if the memory card 40*a* is selected as a subject of recording thereafter, it would allow the same free space as it had before being used as a buffer.

<3. Parallel Processing When Card as Subject of Recording is in Use>

Next, we will discuss parallel processing when the recording medium selected as a subject of recording is in use (i.e., when it is being processed in a task other than that shown in FIG. 7).

If a recording medium selected as a subject of recording is being processed in another processing when recording processing of a captured image is performed, the captured image which is generated through a photographing operation cannot be recorded on the recording medium which is the subject of recording from the image memory 21 and therefore that captured image stored in the image memory 21 which is a temporary memory cannot be deleted until the processing on the recording medium is completed. In continuous photographing or the like, the captured image which is temporarily stored in the image memory 21 should preferably be recorded on another recording medium as soon as possible. In this preferred embodiment, when the recording medium selected as a subject of recording is being used for any processing, another recording medium is used as a temporary buffer, thereby allowing early deletion of the captured image from the image memory 21.

The following description gives, as an example, a case where the magnetic disk card 40b, which is selected as a subject of recording, is being formatted.

Figure 8:
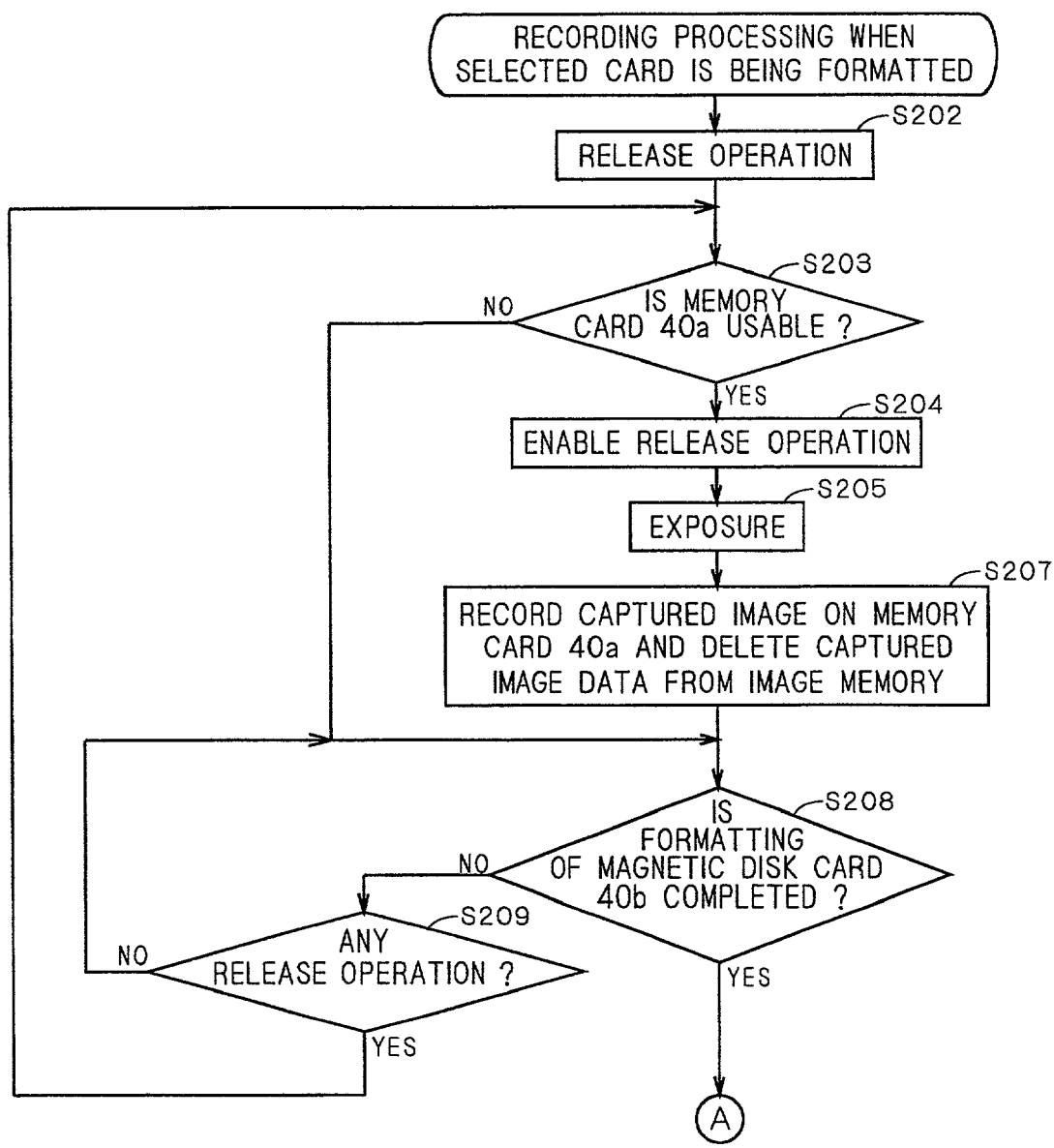
FIGS. 8 to 10 are flow charts of processing when a card selected for recording is being formatted.
Figure 9:
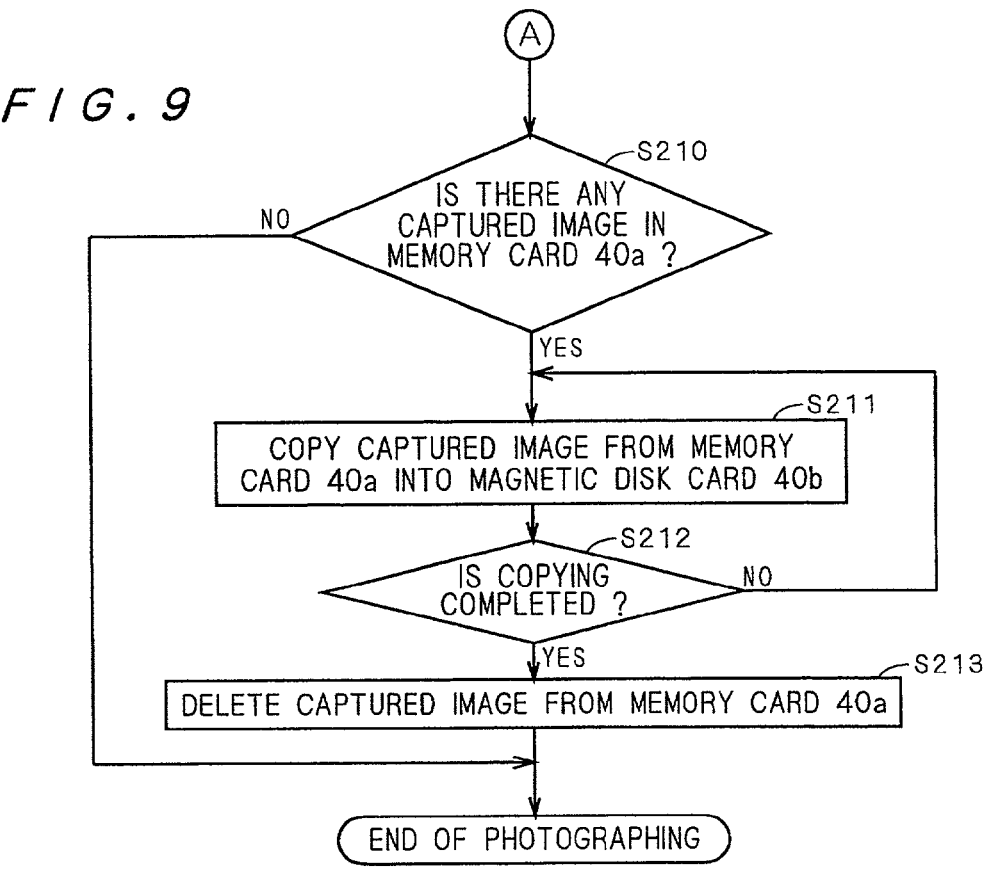
Figure 10:
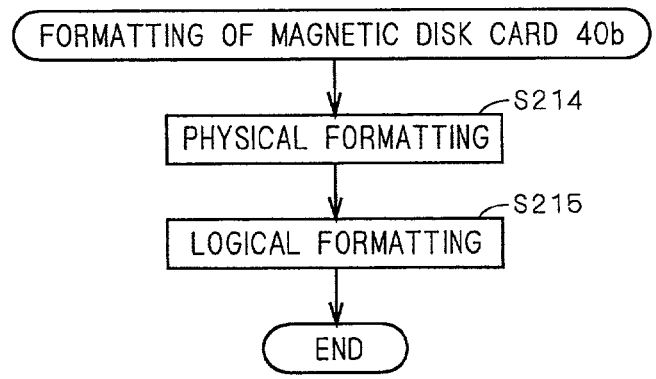

FIGS. 8 to 10 are flow charts of parallel processing when the card selected for recording is being formatted. FIGS. 8 and 9 are flow charts of a task of recording a captured image; and FIG. 10 is a flow chart of a task being performed on the magnetic disk card 40b selected for recording.

First of all, the magnetic disk card 40b is being formatted in accordance with the flow chart of FIG. 10. More specifically, physical formatting takes place in step S214 and logical formatting in step S215. In physical formatting, tracks and sectors are allotted to the disk. In logical formatting, data management information is generated.

In parallel with the task shown in FIG. 10, the task shown in FIGS. 8 and 9 is carried out.

When a user performs a release operation (step S202) during formatting on the condition that the image memory 21 has free space, the execution of the release operation is transmitted from the camera control CPU 31 to the CPU 17 in the image processor 10.

The process goes to step S203, in which the CPU 17 determines whether the other-than-selected memory card 40a is usable or not. More specifically, the CPU 17 determines whether the memory card 40a is loaded in the card slot and whether it has enough free space. If so ("YES"), the process goes to step S204, in which case the memory card 40a is used as a temporary buffer until the formatting of the magnetic disk card 40b is completed. If not ("NO"), the memory card 40a cannot be used as a buffer and the process goes to step S208.

In step S204, the CPU 17 sends to the camera control CPU 31 a notification that an exposure operation in response to the release operation is allowed. With this permission of the release operation, the camera control CPU 31 in step S205 controls drive functions of the diaphragm 4, the image sensor 5, and the like to perform a photographing operation. Consequently, a single captured image generated through the photographing operation in response to the release operation is stored in the image memory 21. That captured image is then subjected to image processing such as pixel interpolation as necessary so that it becomes recordable on the magnetic disk card 40b which is the subject of recording, and is temporarily held in the image memory 21.

In step S207, the CPU 17 records the captured image stored in the image memory 21 on the memory card 40a. Immediately after the recording processing of captured image on the memory card 40a is completed, the CPU 17 deletes the temporarily stored captured image from the image memory 21.

This frees the image memory 21 which is a temporary memory at an early stage even if the magnetic disk card 40b selected as a subject of recording is being formatted, thereby permitting the start of the next photographing operation.

The process then goes to step S208 which determines whether the formatting of the selected magnetic disk card 40b is completed or not. When the formatting is completed ("YES"), the process goes to step S210. If not ("NO"), the process goes to step S209 to wait for the next release operation. With the next release operation ("YES" in step S209), the process returns to step S203.

In step S210, the CPU 17 determines whether the other-than-selected card, i.e., the memory card 40a, has recorded a captured image or not. At this time, a measure of judgment is the presence or absence of a captured image recorded in step S207 and other captured images are not taken into consideration. That is, the focus of judgment is the captured image which was stored in the memory card 40a when that card 40a is used as a buffer during the formatting of the magnetic disk card 40b, not any other captured images which had been recorded before the memory card 40a was used as a buffer. With the presence of a captured image corresponding to the focus of judgment in the memory card 40a ("YES"), the process goes to step S211. Otherwise ("NO"), the photographing operation is completed.

In step S211, the CPU 17 copies the captured image recorded in step S207 from the other-than-selected memory card 40a to the magnetic disk card 40b selected as a subject of recording. Thereby, the captured image is recorded on the user-selected magnetic disk card 40b which is the subject of recording.

In step S212, the CPU 17 determines whether the copying is completed or not. If the copying is completed, the process goes to step S213. Otherwise, the process returns to step S211 to continue the copying.

In step S213, the captured image which has temporarily been stored in the memory card 40a is deleted therefrom since the copying in step S211 makes that image unnecessary. At this time, only the captured image recorded in step S207 is deleted and any other images in the memory card 40a are not to be deleted.

This completes the recording processing of captured image when the magnetic disk card 40b selected as a subject of recording is being formatted. When the memory card 40a is freed in step S207 and the next photographing operation can be started, the release operation in step S204 will be allowed even if the formatting of the magnetic disk card 40b is not completed.

Thus, when the memory card 40a is usable as above described, the use of the memory card 40a as a temporary buffer during the formatting of the magnetic disk card 40b can prevent the user's release operation from being disabled.

When "NO" in step S203, the exposure operation is not performed and consequently the release operation is disabled. In this case, the other-than-selected memory card 40a cannot be used and the same processing as before is performed.

In this fashion, when the magnetic disk card 40b selected as a subject of recording is being formatted, the memory card 40a is used as a temporary buffer. This frees the image memory 21 which is a temporary memory at a relatively early stage after photographing. The digital camera 1 can thus cope with continuous photographing even if the magnetic disk card 40b which is subject of recording is being formatted.

While the above description gives the case where the magnetic disk card 40b is selected as a subject of recording, the present invention is not limited thereto and the same applies to the case where the memory card 40a is selected as a subject of recording.

When a recording medium selected as a subject of recording is being processed in any desired processing, the use of another recording medium as a buffer allows a photographing operation to be performed without waiting for the completion of the processing on the recording medium selected as a subject of recording. Thus, the digital camera 1 should be configured such that when a recording medium selected as a subject of recording out of a plurality of recording media is being processed with one task as in this preferred embodiment, another recording medium of the plurality of recording media can temporarily record a captured image with another task. This allows a photographing operation to be performed without waiting for the completion of the processing on the recording medium selected as a subject of recording.

<4. Parallel Processing on Recording Medium being Not Subject of Recording>

Performing one processing on a recording medium to be a subject of recording and another processing on another recording medium in parallel, as above described, is based on the premise that the CPU 17 serving as a controller can perform a plurality of tasks in parallel.

Such examples of processing on a recording medium which is not the subject of recording are now discussed with reference to FIGS. 11 to 15. In the forms of processing shown in FIGS. 11 to 15, the type of recording medium (whether it is a memory card, a magnetic disk card, or any other card) is not specifically confined. Thus, the following description gives the cases where a recording medium 40c is loaded in the first slot 41a of the digital camera 1 and a recording medium 40d in the second slot 41b, and the recording medium 40c is selected as a subject of recording by a user.

Figure 11:
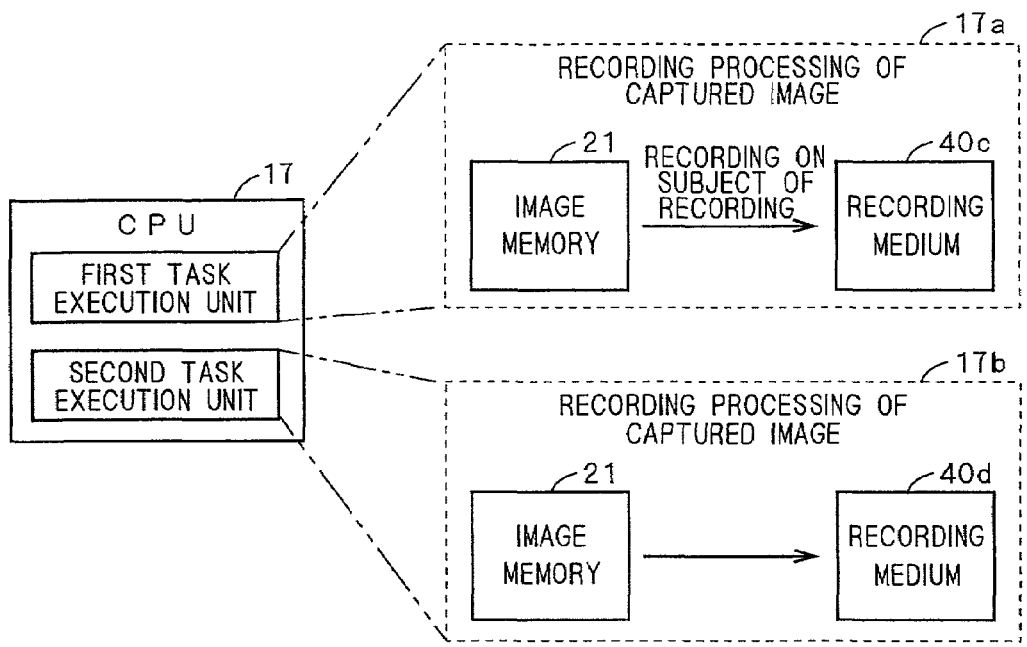
FIGS. 11 to 15 show examples of processing on a recording medium which is not the subject of recording.

FIG. 11 shows a form of parallel processing performed on the recording medium 40d which is not the subject of recording. The CPU 17 performs the first task execution which is shown in FIG. 7, thereby to record a captured image, which has been generated in response to a photographing operation and temporarily stored in the image memory 21, on the recording medium 40c selected as a subject of recording. On the other hand, the CPU 17 carries out the second task execution in parallel with the first task execution on the condition that the image memory 21 has free space, thereby to perform the task shown in FIG. 7 in parallel. Such parallel processing enables the execution of a photographing operation in the background of the task of recording a captured image on the recording medium 40c which is the subject of recording.

Figure 12:
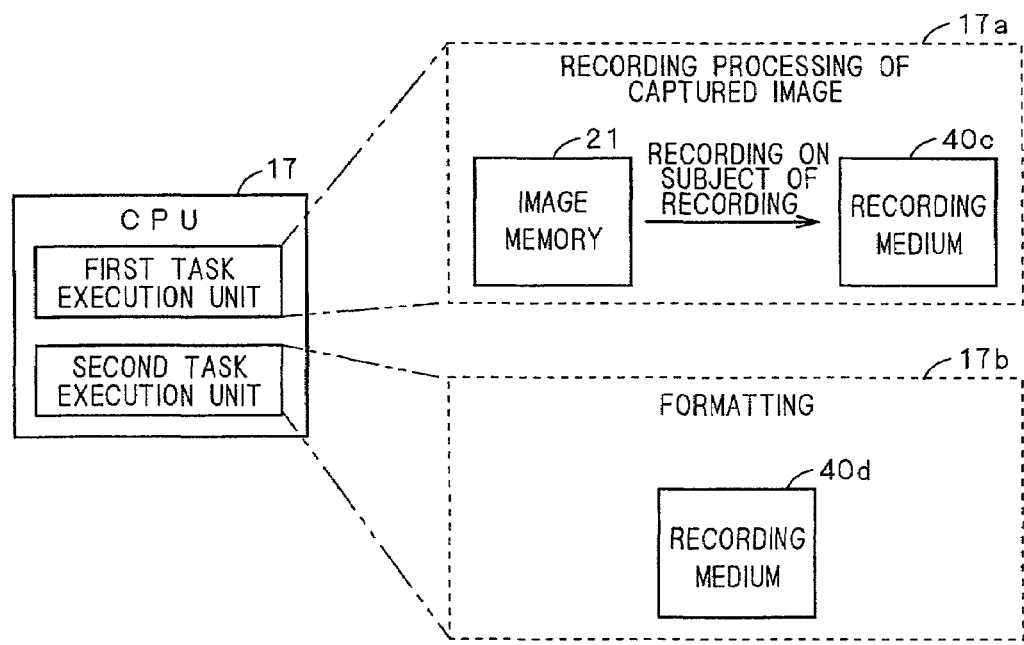

FIG. 12 shows a form of parallel processing when the formatting of the recording medium 40d which is not the subject of recording is performed. The CPU 17 performs the first task execution, thereby to record a captured image, which has been generated in response to a photographing operation and temporarily stored in the memory 21, on the recording medium 40c selected as a subject of recording. On the other hand, the CPU 17 performs the second task execution in parallel with the first task execution, whereby the recording medium 40d which is not the subject of recording is formatted. Such parallel processing enables the formatting of the recording medium 40d which is not the subject of recording, in the background of the main task.

In the case of FIG. 12, when the recording medium 40d is selected as a subject of recording, the same processing as shown in the flow chart of FIG. 8 is performed. That is, when recording a captured image on the recording medium 40d selected as a subject of recording, the recording medium 40c which is not the subject of recording is used as a buffer to temporarily store the captured image.

Figure 13:
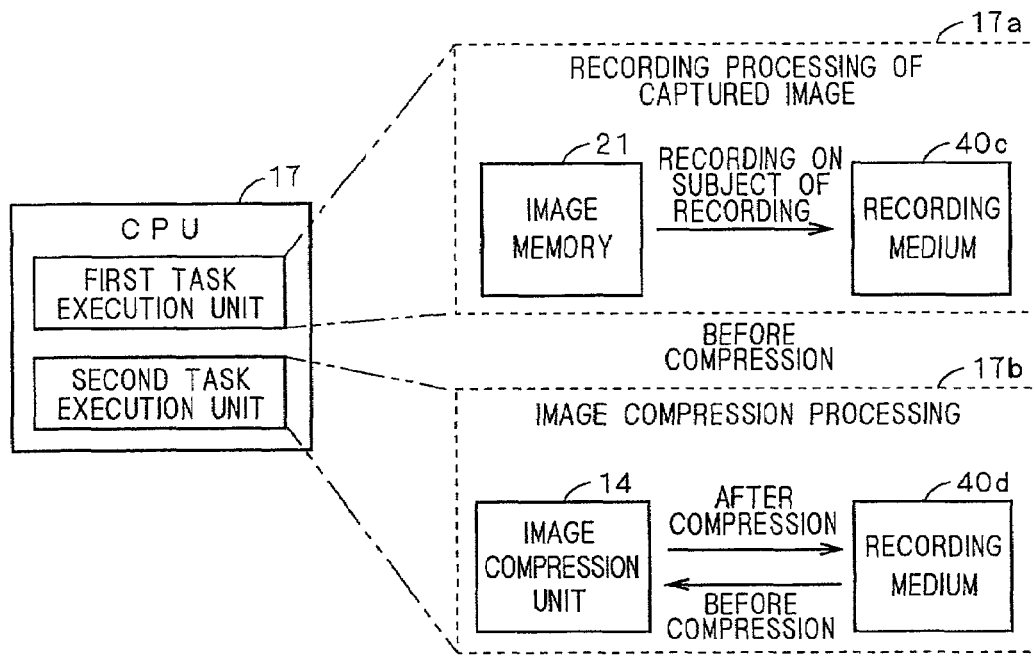

FIG. 13 shows another form of parallel processing when any desired image processing is performed on a captured image stored in the recording medium 40d which is not the subject of recording. The CPU 17 performs the first task execution, thereby to record a captured image, which has been generated in response to a photographing operation and temporarily stored in the image memory 21, on the recording medium 40c selected as a subject of recording. On the other hand, the CPU 17 performs the second task execution in parallel with the first task execution, whereby captured image data previously recorded on another recording medium 40d which is not the subject of recording is read out, transmitted to the image compressor 14 where compression processing is performed at a predetermined compression rate, and recorded again on the recording medium 40d. Herein, image compression is given as an example of image processing; however, other image processing may be performed. Such parallel processing enables the execution of image processing on the captured image data recorded on the recording medium 40d which is not the subject of recording, in the background of the main task.

As previously described, the digital camera 1 is connectable to other external equipment through the external interface 20. Therefore, parallel processing of a plurality of tasks in the CPU 17 enables data communications with external equipment in the background of the main task.

Figure 14:
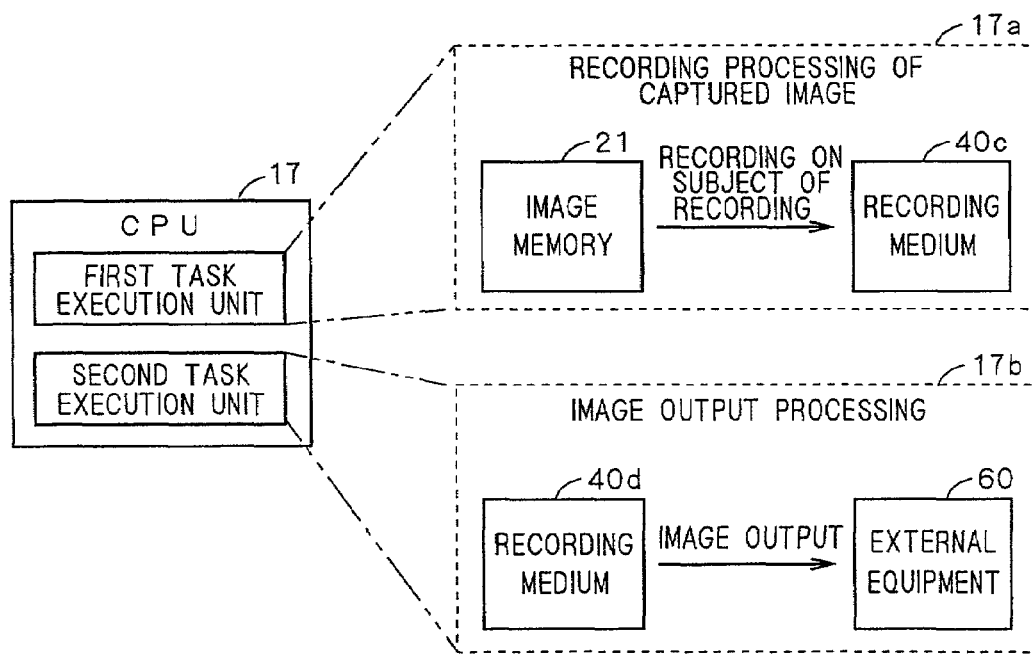

FIG. 14 shows a form of parallel processing when a captured image in the recording medium 40d which is not the subject of recording is outputted to external equipment 60. The CPU 17 performs the first task execution, thereby record a captured image, which has been generated in response to a photographing operation and temporarily stored in the image memory 21, on the recording medium 40c selected as a subject of recording. The CPU 17 also performs the second task execution in parallel with the first task execution, whereby a captured image is read out from another recording medium 40d which is not the subject of recording, transmitted to the external interface 20, and outputted as output image data to the external equipment 60.

Figure 15:
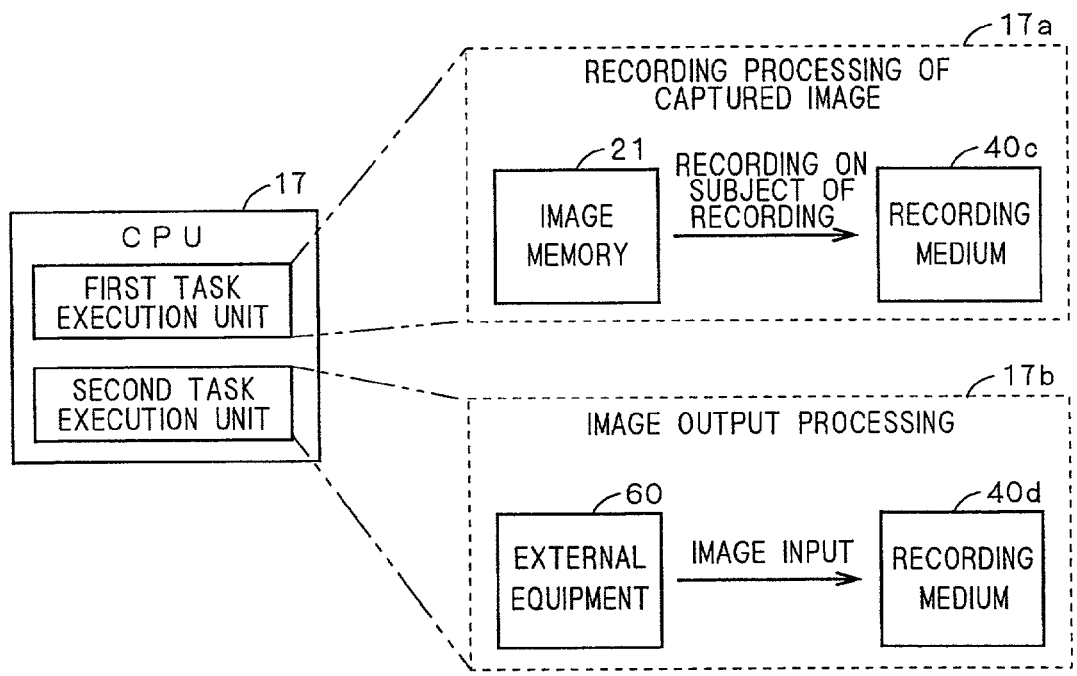

FIG. 15 shows a form of parallel processing when an image or the like received from the external equipment 60 is recorded on the recording medium 40d which is not the subject of recording. The CPU 17 performs the first task execution, thereby to record a captured image, which has been temporarily stored in the image memory 21, on the recording medium 40c selected as a subject of recording. The CPU 17 also performs the second task execution in parallel with the first task execution, whereby an image or the like is received from the external equipment 60 which is connected through the external interface 20, and then recorded on the recording medium 40d which is not the subject of recording.

Such parallel processing enables data communications with the external equipment 60 in the background of the photographing operation of the digital camera 1.

Figure 16:
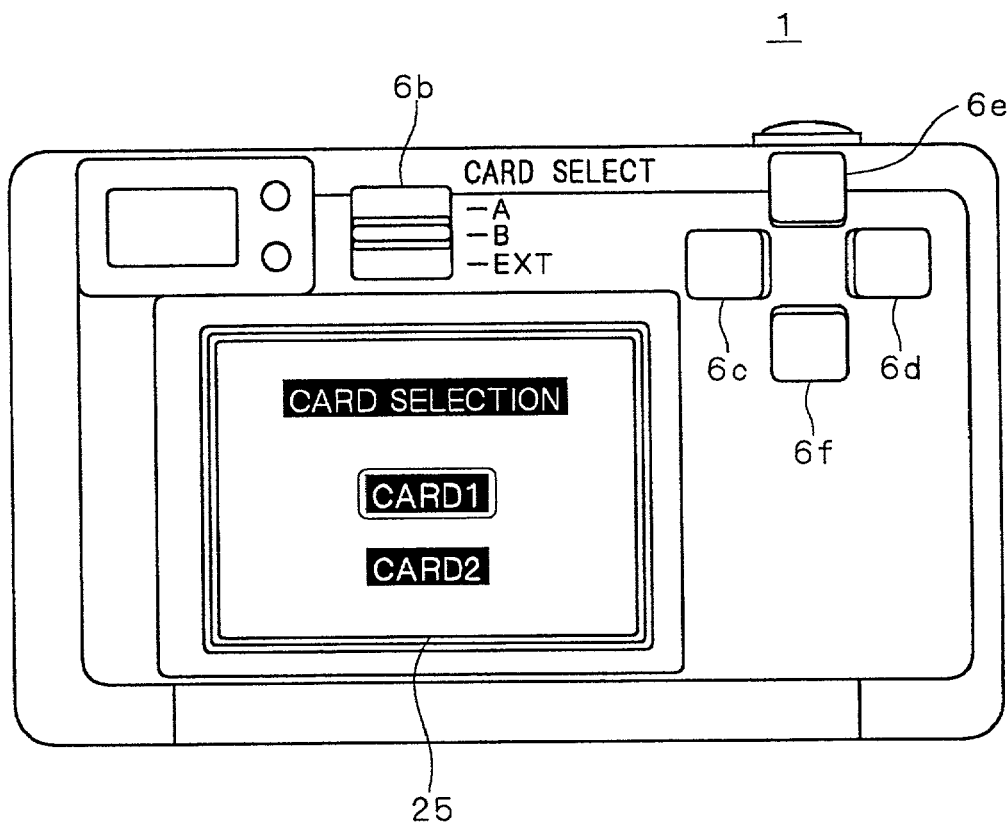
FIG. 16 shows a digital camera in displaying a card selection screen.

The forms of processing as shown in FIGS. 14 and 15 are taken when a user designates the execution of background processing as above described. For a user to select which kind of processing is to be performed in the background, the CPU 17 controls the monitor 25 to display a card selection screen. FIG. 16 shows the digital camera 1 displaying such a card selection screen on the monitor 25.

As shown in FIG. 16, the setting selection switch 6b is placed in its "central" position; therefore, the recording medium 40c ("CARD 2") loaded in the slot B (i.e., the slot 41b) is selected as a subject of recording of a captured image. At this time, the card selection screen as shown in FIG. 16 shall appear on the monitor 25.

On the card selection screen of FIG. 16, a recording medium ("CARD 1") loaded in the slot 41 a is selected as a destination of data supply.

When a user operates cursor-control keys (e.g., the down key 6f) as a decision key with the card selection screen as shown in FIG. 16, the recording medium loaded in the slot 41b is selected as a subject of recording of a captured image which is generated through a photographing operation. Also, processing for the input of an image or the like from the external equipment 60 and the recording thereof on the recording medium loaded in the slot 41a is selected as multiple task processing performed in the background of the CPU 17.

Consequently, the processing as shown in FIG. 15 is executed by the CPU 17.

In this fashion, when recording a captured image on a recording medium which is selected as a subject of recording out of a plurality of recording media, any desired processing is performed in parallel on another recording medium which is not the subject of recording. This enables the execution of necessary processing on the recording medium which is not the subject of recording, in the background of the main task. Such processing on the recording medium which is not the subject of recording prevents the release operation from being disabled, thereby allowing photographing operations to be performed at the appropriate times.

<5. Processing When External Equipment is Another Digital Camera>

In the above descriptions with FIGS. 14 and 15, no mention is made of what kind of device is the external equipment 60. If another digital camera is connected as the external equipment 60, an image recording system that can achieve recording processing of a variety of captured images can be configured.

Figure 17:
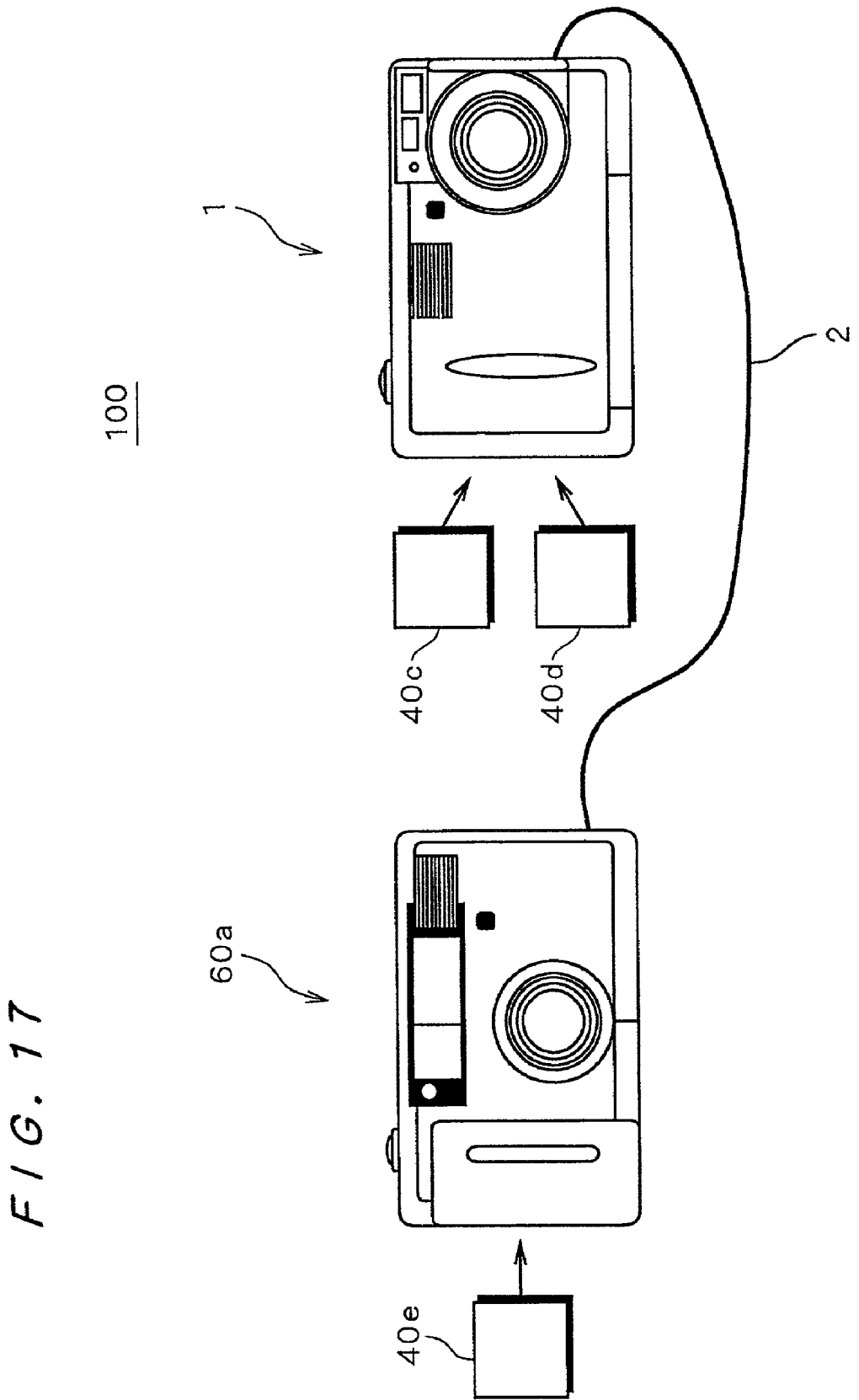
FIG. 17 shows a construction of an image recording system.

FIG. 17 shows a configuration of such an image recording system 100. As shown in FIG. 17, this image recording system 100 is comprised of a first digital camera 1 and a second digital camera 60a connected with each other through a cable 2 which is a transmission medium that makes data communications possible. The first digital camera 1 is a digital camera with the above-described construction, which can load two recording media 40c, 40d and comprises the CPU 17 that can perform a plurality of tasks in parallel. When viewed from the first digital camera 1, the second digital camera 60a corresponds to the external equipment 60. The second digital camera 60a, on the other hand, can load at least one recording medium 40e.

In such a configuration of the image recording system 100, for example, a first captured image, which is obtained through a photographing operation with the first digital camera 1, is recorded on the recording medium 40c, and in parallel with that recording, a second captured image, which is obtained through a photographing operation with the second digital camera 60a, is input into the first digital camera 1 through the cable 2 and recorded on the recording medium 40d. Thus, even if the recording medium 40e in the second digital camera 60a is short of free space, both the digital cameras can perform photographing operations at the appropriate times.

Further, even when a captured image which is recorded on the recording medium 40c in the first digital camera 1 is copied into the recording medium 40e in the second digital camera 60a, recording of a first captured image, which is obtained through a photographing operation with the first digital camera 1, onto the recording medium 40d can be performed in parallel with output of captured image data, which is recorded on the recording medium 40c, to the second digital camera 60a. The first digital camera 1 can thus perform photographing operations at the appropriate times.

Furthermore, even when a captured image is copied from the recording medium 40c into the recording medium 40d within the first digital camera 1, the second digital camera 60a which is the external equipment 60 for the first digital camera 1 should be selected as a subject of recording. By so doing, a captured image obtained through a photographing operation with the first digital camera 1 can be recorded on the recording medium 40e in the second digital camera 60a. Therefore even if the copying of captured image from the recording medium 40c into the recording medium 40d is being performed, the first digital camera 1 can perform photographing operations at the appropriate times.

<6. Processing When External Equipment is Printer>

Next, processing when the external equipment 60 is a printer is discussed.

FIG. 18 shows an image recording system 200 when a printer 60b is connected as external equipment. This image recording system 200 comprises the digital camera 1 and the printer 60b connected with each other through the cable 2. The digital camera 1 has the aforementioned construction.

In such a system configuration, recording of a captured image, which is obtained through a photographing operation with the digital camera 1, on the recording medium 40c can be performed in parallel with output of captured image data, which is recorded on the recording medium 40d, into the printer 60b. The digital camera 1 can thus perform photographing operations at the appropriate times even during printout of captured image data.

<7. Modifications>

So far, one preferred embodiment of the present invention has been described; however, it is to be understood that the present invention is not limited thereto.

For instance, the aforementioned CPU 17 may be located in a unit other than the image processor 10. Further, although a single CPU 17 performs a plurality of task in parallel in the above description, the present invention is not limited thereto. In fact, a plurality of CPUs may be provided to perform a plurality of tasks in parallel and those CPUs may constitute a controller.

In the above description, each recording medium is removable from the digital camera 1; however, the present invention is not limited thereto. Alternatively, the digital camera 1 may have built-in storage media. In such a case, also, the digital camera 1 would achieve the same effect of preventing the release operation from being disabled, thereby permitting continuous photographing and the like.

While the invention has been shown and described in detail, the foregoing description is in all aspects illustrative and not restrictive. It is therefore understood that numerous modifications and variations can be devised without departing from the scope of the invention.

What is claimed is:

1. A digital camera, comprising:
a plurality of media provided for recording and storing a captured image generated in response to a photographing operation; and
a controller capable of performing a plurality of tasks in parallel, said controller when performing a first task to record said captured image on a medium which is selected as a subject of recording out of said plurality of media, performing a second task which is different from said first task to perform predetermined processing on a medium which is not said subject of recording, wherein said predetermined processing is formatting of a medium which is not said subject of recording.

2. A digital camera comprising:

a plurality of slots capable of loading a plurality of media for recording and storing a captured image generated in response to a photographing operation; and a controller capable of performing a plurality of tasks in parallel, said controller when performing a first task to record said captured image on a medium which is selected as a subject of recording out of said plurality of media loaded in said plurality of tasks, performing a second task which is different from said first task to perform predetermined processing on a medium which is not said subject of recording, wherein said predetermined processing is formatting of a medium which is not said subject of recording.

3. The digital camera according to claim 1, wherein the plurality of media include media employing magnetic recording and media employing a semiconductor memory.

4. The digital camera according to claim 2, wherein the plurality of media include media employing magnetic recording and media employing a semiconductor memory.

* * * * *